United States Patent [19]
Huzinec

[11] 3,892,610
[45] July 1, 1975

[54] FREEZE DRYING PROCESS OF MAKING ULTRA-FINE AMMONIUM PERCHLORATE AND PRODUCT

[75] Inventor: John R. Huzinec, Ridgeley, W. Va.

[73] Assignee: Hercules Incorporated, Wilmington, Del.

[22] Filed: Jan. 8, 1973

[21] Appl. No.: 321,889

[52] U.S. Cl. .................. 149/76; 149/7; 149/19.92; 149/113
[51] Int. Cl. ............................................. C06b 19/02
[58] Field of Search ......... 149/7, 19, 76, 113, 19.92

[56] References Cited
UNITED STATES PATENTS

| | | | |
|---|---|---|---|
| 3,350,245 | 10/1967 | Dickinson | 149/19 |
| 3,651,008 | 3/1972 | Moser et al. | 149/19 X |
| 3,666,575 | 5/1972 | Fisher | 149/19 |
| 3,685,163 | 8/1972 | Olt | 149/113 UX |
| 3,695,952 | 10/1972 | Allen | 149/19 |

Primary Examiner—Benjamin R. Padgett
Assistant Examiner—E. A. Miller
Attorney, Agent, or Firm—S. Grant Stewart

[57] ABSTRACT

Manufacture of ultra-fine ammonium perchlorate for incorporation into propellants, including the steps of a. forming an aqueous solution of ammonium perchlorate (AP), and admixing said solution with an organic liquid immiscible with water and substantially a nonsolvent for AP, b. incorporating into the resulting admixture a branched chain hydroxy terminated polybutadiene (HTPB) having a molecular weight not exceeding about 2500, and a defined diester, and agitating the resulting water, AP, diester, and HTPB to form an emulsion comprising said organic liquid as continuous phase and said aqueous ammonium perchlorate solution as dispersed phase, c. freezing the emulsion, d. subliming the organic liquid and ice from the frozen emulsion, and e. recovering residual ultra-fine ammonium perchlorate particles as product of the process.

A composite propellant containing, as a binder, a branched chain HTPB having a molecular weight not exceeding about 2500, a defined diester as a plasticizer, and finely ammonium perchlorate as an oxidizer produced in accordance with process above described.

Ultra-fine ammonium perchlorate produced in accordance with process above described.

9 Claims, No Drawings

FREEZE DRYING PROCESS OF MAKING ULTRA-FINE AMMONIUM PERCHLORATE AND PRODUCT

This invention relates to a process for the manufacture of ultra-fine ammonium perchlorate particles (UFAP) and to resulting ammonium perchlorate product. In one aspect this invention relates to a freeze drying process for the manufacture of UFAP for incorporation into a propellant, as an oxidizer component, containing only processing impurities which are compatible with the propellant as active ingredients thereof, thereby providing the ammonium perchlorate product as a substantially pure oxidizer component. In another aspect this invention relates to propellants containing ammonium perchlorate product of the above described manufacture. Other aspects will be apparent in light of the accompanying disclosure and the appended claims.

Ultra-fine particles of ammonium perchlorate are required in some propellant formulations in order to obtain a high burning rate solid propellant for rockets. It is well known that increased burning rate and thrust in rocket motors can be obtained by increasing the surface area of the oxidizer employed in the propellant composition. Current methods for producing fine particles of ammonium perchlorate are grinding and ball milling of ammonium perchlorate, and freeze drying of a frozen solution of ammonium perchlorate in water. This latter process is described in detail in U.S. Pat. No. 3,452,445. A modified process involving freeze drying an ammonium perchlorate emulsion is disclosed and claimed in U.S. Pat. No. 3,685,163.

The freeze drying process described in the above referred to U.S. Pat. No. 3,685,163 involves forming an emulsion of aqueous ammonium perchlorate and an organic liquid immiscible with water and substantially a nonsolvent for the ammonium perchlorate, and freeze drying the emulsion for recovery of the UFAP product. The emulsion to be freeze dried must retain its stability during the entire freeze drying process in order to preclude separation and coagulation of solution droplets with accompanying formation of unduly large ammonium perchlorate product particles. In most instances an emulsifying agent is required for maintenance of the emulsion stability. However, the emulsifying agent does not separate from the ammonium perchlorate particle product, and hence it constitutes a process impurity material which will become incorporated into the propellant.

Often, hydroxy terminated polybutadienes (HTPB) have been utilized as a binder for composite propellants. Although straight chain HTPB propellant binder materials are often utilized, lower molecular weight branched chain type are more often preferred.

I have discovered an emulsion freeze drying process in accordance with which ultra-fine particulate ammonium perchlorate, particularly applicable as an oxidizer ingredient for composite propellants, is prepared, which contains only those process impurity materials which serve as active propellant ingredients upon incorporation of the ammonium perchlorate product into the propellant. Hence, the ammonium perchlorate product can be incorporated into such composite propellants on substantially a contaminant-free basis.

In accordance with the invention, a process is provided for preparation of ultra-fine ammonium perchlorate particles for incorporation as oxidizer into solid composite propellants comprising dissolving ammonium perchlorate in water to form an aqueous solution of ammonium perchlorate, admixing said aqueous solution of ammonium perchlorate with an organic liquid immiscible with water and substantially a nonsolvent for ammonium perchlorate, for the formation of an emulsion comprising said organic liquid as continuous phase and said aqueous ammonium phosphate solution as dispersed phase therein;

incorporating into the resulting admixture a branched chain hydroxy terminated polybutadiene having a molecular weight below about 2500 as measured by osmometer as an emulsifier for formation of said emulsion and a diester of an alcohol having at least 2 carbon atoms in the molecule and a dicarboxylic acid having at least 3 carbon atoms in the molecule as a stabilizer for said emulsion, and agitating the resulting mixture of water, ammonium perchlorate, diester, and hydroxy terminated polybutadiene to form said emulsion freezing the emulsion, subliming the organic liquid and ice from the frozen emulsion, and recovering residual fine ammonium perchlorate particles as product of the process.

Further in accordance with the invention, composite propellant formulations, containing ultra-fine ammonium perchlorate, prepared in accordance with the above described process, are provided.

Still further in accordance with the invention, ultra-fine ammonium perchlorate produced in accordance with the above described process, is provided.

The ammonium perchlorate which is employed in preparing the aqueous solution of ammonium perchlorate can be of a commercial grade material. Higher grade ammonium perchlorate can be employed if desired. The ammonium perchlorate is advantageously dissolved in deionized water or other suitably purified water to avoid product impurities. The aqueous solution of ammonium perchlorate generally comprises on a weight basis from about 85 to about 95 percent water and from about 15 to about 5 percent ammonium perchlorate. If the content of ammonium perchlorate in the aqueous solution is below about 5 percent, the process of this invention is not economical; and if the content exceeds about 15 percent at room temperature the solution approaches saturation, and growth of ammonium perchlorate crystals begins. While slightly larger quantities of ammonium perchlorate can be dissolved in the solution at higher temperatures of say up to about 100°F., the difficulty in forming an emulsion of ammonium perchlorate in water at these higher temperatures is greatly increased.

Exemplary organic liquids which can be employed in preparing the aqueous emulsion include straight chain and branched chain aliphatic hydrocarbons having from about 7–12 carbon atoms such as heptane, octane, isooctane, nonane, decane, undecane, and mixtures thereof; aromatics such as benzene, toluene, ortho xylene, para xylene, meta xylene and mixtures thereof; aliphatic alcohols having from about 6–12 carbon atoms such as 1-hexanol, 1-octanol, 1-decanol and mixtures thereof and the like.

Neither the branched chain hydroxy terminated polybutadiene, nor the diester, alone, is operable as an emulsifier, or stabilizer, in the emulsion-freeze drying of the prior art for the formation of ultra-fine ammonium perchlorate. However, my invention is based on the discovery that, in combination, the diester stabilizes the emulsifying action of the low molecular weight branched chain hydroxy terminated polybutadiene to form the required emulsion for the freeze drying step.

Neither the diester, nor the hydroxy terminated polybutadiene is sublimed from the emulsion during the freeze drying step, and hence they remain as components of the residual ammonium perchlorate product. However, I have found that the ammonium perchlorate product (UFAP) can be advantageously incorporated, as an oxidizer, into composite propellants containing low molecular weight branched chain hydroxy terminated polybutadiene as a binder, and a diester plasticizer, without need for first removing the diester and polybutadiene "impurities"; and that that can be accomplished while, in effect, incorporating the ammonium perchlorate product into the propellant on a substantially contaminant-free basis. I have discovered that the residual polybutadiene and diester in the ammonium perchlorate product, are compatible with the composite propellant formulation as ingredients of the binder and plasticizer components, respectively; and, from that standpoint, the ammonium perchlorate product is most advantageously incorporated into composite propellants containing a branched chain hydroxy terminated polybutadiene, and diester, the same as those in the ammonium perchlorate product.

Based on the weight of the emulsion, from about 1.1 to 2.5 percent of the hydroxy terminated polybutadiene emulsifier, and from about 0.12 to 0.16 percent of the organic diester stabilizer, are generally utilized. Generally, sufficient of each of the hydroxy terminated polybutadiene and diester is incorporated into the emulsion to provide particulate ammonium perchlorate product containing (weight basis) from about 1 to 3 percent of HTPB and from 0.1 to 0.3 percent of the diester. The molecular weight of the HTPB utilized in accordance with the invention is generally at least about 1000.

Exemplary diesters that can be employed in preparing the aqueous emulsion include allyltriethyl citrate, triethyl citrate, allyltributyl citrate, tributyl citrate, triacetan, dioctyl adipate (DOA) and isodecyl pelargmate, (IDP).

The weight ratio of aqueous ammonium perchlorate solution, sometimes referred to as the water phase, to the organic liquid, sometimes referred to as the oil phase, in preparing an emulsion for use in the process of the invention is an important factor influencing the particle size of the ammonium perchlorate product and is preferably from about 5:1 to about 21:1; and the ammonium perchlorate product particle size distribution is generally within the range of from 0.2 to 1 micron.

The emulsion is advantageously prepared by vigorously agitating the mixture of water, organic liquid, ammonium perchlorate, HTPB and ester ingredients in a high shear mixer. Mixers of this type include by way of illustration, Waring Blenders and Manton-Gaulin Homogenizers.

The time required to produce the emulsion in high shear mixers is dependent upon the organic liquid employed, and the weight ratio of water phase to oil phase. In general, the emulsion can be prepared with high shear agitation in about 3 minutes or less.

One procedure for freezing the emulsion includes pouring or ladling the emulsion directly into liquid nitrogen ($-195°C.$) which is a rapid freezing technique. In accordance with another procedure, emulsion frozen on a freezing surface such as on a tray held at a temperature of at least $-40°C$. This tray procedure is a moderate freezing rate technique with freezing time being in the order of 5 to 10 minutes depending on emulsion bed depth.

The freezing step is determinative of the particle size of ammonium perchlorate that can be produced. Smaller ammonium perchlorate particle size is possible when the emulsion is frozen very rapidly, say in the order of a few seconds after preparation of the emulsion. Stable emulsions can be frozen at a lower freezing rate with little effect on the resulting particle size of the ammonium perchlorate produced. A stable emulsion of aqueous ammonium perchlorate in organic liquid is defined herein as an emulsion in which the dispersed phase maintains its dispersed condition within the continuous phase during the time required to complete freeze drying.

Freeze drying of the emulsions of this invention has little or no influence on the ammonium perchlorate particle size produced, but it does affect the final product dryness and thus the storage behavior of the product. If the ammonium perchlorate particles produced are not sufficiently dried, the particles will agglomerate during storage. In the freeze drying step of this process, both the water and the organic liquid of the frozen emulsion are separated from the ammonium perchlorate by sublimation. Ammonium perchlorate crystal growth is prevented while the emulsion remains in the frozen state.

Freeze drying involves both heat transfer and mass transfer operations. Optimum drying rates are achieved when all areas of the product are dried evenly and when the heat flux into the drying mass is sufficient to keep the drying surface temperature just slightly below the melting point of the water ammonium perchlorate crystal mixture. As the drying surface recedes, the heating temperature must be increased because the frozen material is in effect insulating itself with a coating of dried product. Such a heat flow control must be determined by actual experimentation. Drying rate is affected by heat and water vapor transport rate. Water vapor diffusion takes place through the dried portion of the material. After the vapor escapes from the bed of drying material, it moves by hydrodynamic flow to the condenser. Thus, increasing bed depth of the emulsion being dried significantly slows the drying rate due to increased resistance in both the heat and mass transport processes. Optimization of the drying process requires balancing tray loading with drying time to achieve maximum drier throughput.

It is generally preferred to operate the freeze drier at a reduced pressure of below about $175\mu$ Hg. Actual reduced pressure conditions within the freeze drier required to adequately dry the emulsions of this invention will vary depending on the organic liquid which is being sublimed during the freeze drying operation and the design of the freeze drier itself. The heat input to the freeze drier must be carefully programmed to obtain a maximum drying rate. If the rate of heat input to the drier is too high, back melting of the emulsion can occur which leads to larger AP solution droplets and hence larger AP particle size.

The following examples more fully illustrate the process of the invention. In these examples, parts and percentages are by weight unless otherwise specified.

EXAMPLE 1

An aqueous solution of ammonium perchlorate is prepared by dissolving 10.9 grams of ammonium perchlorate in 62.1 grams of water. To the resulting solution is added 0.15 grams of dioctyl adipate (DOA) and 2.5 grams hydroxy terminated polybutadiene dissolved in 24.3 grams n-octane. The resulting admixture is agitated in a Waring Blender for about 1 minute to form an emulsion in which the n-octane is a continuous phase containing the aqueous solution phase of ammonium perchlorate uniformly dispersed throughout.

The emulsion is ladled into liquid nitrogen at −195°C. and is completely and rapidly frozen. The frozen emulsion is removed from the liquid nitrogen and placed in a freeze drier which is a Repp Model FFD-15-WS Vacuum Sublimator. The freeze drier is operated at a reduced pressure of between about 75 and 550 microns Hg during the drying cycle. The pressure measured at the end of the drying cycle is about 175 microns Hg. At the end of the drying cycle ammonium perchlorate particles are recovered. The recovered ammonium perchlorate particles have a weight mean diameter of about 0.3 microns. Associated data are set forth in the summary tabulation below.

EXAMPLE 2

The procedure of Example 1 is repeated except that the organic ester stabilizer is isodecyl pelargmate (IDP) as summarized in the tabulation below.

EXAMPLE 3

The procedure of Example 1 is repeated, with slight variation of the ingredient materials, as summarized in the tabulation below.

EXAMPLE 4

The procedure of Example 3 is repeated except that the organic ester stabilizer is isodecyl pelargmate, as summarized in the tabulation.

As illustrated with reference to the above examples, the process of the invention provides for ammonium perchlorate particulate product having a particle size not exceeding, and generally significantly less than, about 1 micron, more often less than about 0.6 micron.

EXAMPLE 5

The procedure of Example 1 is repeated except that the organic ester stabilizer is replaced by an additional amount of hydroxy terminated polybutadiene. A weak dispersion of the organic phase in the water phase is obtained which immediately separates upon cessation of agitation.

EXAMPLE 6

The procedure of Example 1 is repeated except that the hydroxy terminated polybutadiene is replaced by an additional amount of organic ester dioctyl adipate (DOA). A weak dispersion of the organic phase in the water phase is obtained which immediately separates upon cessation of agitation.

Exemplary composite propellant formulations containing ammonium perchlorate formed in accordance with the invention (UFAP) as illustrated with reference to the above examples, are as follows:

|  | A | B | C | D |
|---|---|---|---|---|
| HTPB Binder | 20 | 10.5 | 10 | 13 |
| Catocene | 8 | 4.5 | — | — |
| Carborane | — | — | 5 | — |
| Fe₂O₃ | — | 13 | — | 2 |
| Al | — | 13 | 13 | 13 |
| AP, 50μ | — | 17 | 17 | 17 |
| AP, 10μ | — | 20 | 20 | 20 |
| UFAP | 72 | 35 | 35 | 35 |

The primary uses of these formulation types are in missiles where high acceleration are a major requirement.

The ammonium perchlorate product of the invention can be incorporated into the composite propellant for-

| Summary of Examples 1–4 Emulsion Composition, Wt. Percent |||||
|---|---|---|---|---|
| Example No. | 1 | 2 | 3 | 4 |
| Ammonium Perchlorate | 10.9 | 10.9 | 11.1 | 11.1 |
| Water | 62.1 | 62.1 | 63.1 | 63.1 |
| n-octane | 24.3 | 24.3 | 24.5 | 24.5 |
| Hydroxy terminated polybutadiene | 2.5 | 2.5 | 1.1 | 1.1 |
| Organic Ester |  |  |  |  |
| DOA | .153 | 0.124 | — | — |
| IDP | — | .153 | — | 0.124 |
| Product Product Composition, wt. percent |  |  |  |  |
| Ammonium Perchlorate | 80.5 | 80.5 | 90.0 | 90.0 |
| Hydroxy terminated polybutadiene | 18.4 | 18.4 | 9.0 | 9.0 |
| Organic Ester | — | — | — | — |
| DOA | 1.1 | — | 1.0 | — |
| IDP | — | 1.1 | — | 1.0 |
| Ammonium Perchlorate Product- Particle Size Distribution, Microns |  |  |  |  |
| Utilizing DOA | 0.27 | 0.3 | 0.35 | 0.4 |
| Utilizing IDP | 0.4 | 0.45 | 0.5 | 0.55 | mulations in any suitable manner. In accordance with one procedure, the ultra-fine ammonium perchlorate product is added in three separate increments with a minimum of 5 minutes mixing time, after each addition, to a previously formed mixture of binder ingredients, liquid burning rate catalyst and volatile solvent, all in conventional proportions. The remaining solid ingredients of the formulation are added, in increments, to the resulting ammonium perchlorate system, with mixing intermediate each addition. After all ingredients are added, the resulting mixture is heated usually at about 60°C., and mixed under vacuum generally at about 5 mm Hg, or less, which is progressively accomplished over a period of about 1 hour. Upon accomplishment of full vacuum, mixing is continued for at least about one-half hour. Cure catalyst is then added with subsequent vacuum mixing for another half hour followed by casting and curing of the propellant formulation by conventional means.

What I claim is:

1. A process for preparation of ultra-fine ammonium perchlorate particles for incorporation as oxidizer into composite propellants comprising:

dissolving ammonium perchlorate in water to form an aqueous solution of ammonium perchlorate, admixing said aqueous solution of ammonium perchlorate with an organic liquid immiscible with water and substantially a nonsolvent for ammonium perchlorate for the formation of an emulsion comprising said organic liquid as continuous phase and said aqueous solution as dispersed phase therein;

incorporating into the resulting admixture a branched chain hydroxy terminated polybutadiene (HTPB) having a molecular weight not exceeding about 2,500 as an emulsifier for the formation of said emulsion, and a diester of an alcohol having at least 2 carbon atoms in the molecule and a dicarboxylic acid having at least 3 carbon atoms in the molecule as a stabilizer for said emulsion, and agitating the resulting mixture of water, ammonium perchlorate, diester, and HTPB to form said emulsion, freezing said emulsion, subliming the said organic liquid and ice from the frozen emulsion, and recovering residual fine ammonium perchlorate particles as product of the process.

2. A process of claim 1 wherein said diester is dioctyl adipate.

3. A process of claim 1 wherein said diester is isodecyl pelargmate.

4. A process of claim 1 wherein the aqueous solution of ammonium perchlorate comprises, on a weight basis from about 85 to about 95 percent water, and from about 15 to about 5 percent ammonium perchlorate.

5. A process of claim 4 wherein the weight ratio of the aqueous ammonium perchlorate solution to the said organic liquid is from about 5:1 to about 21:1.

6. A process of claim 5 wherein the molecular weight of said hydroxy terminated polybutadiene is within the range of from about 1,000 to 2,500.

7. A process of claim 6 wherein said organic ester is selected from the group of dioctyl adipate and isodecyl pelargmate.

8. A process of claim 7 wherein sufficient of each of said hydroxy terminated polybutadiene and said diester is incorporated into said emulsion to provide particulate ammonium perchlorate product containing on a weight basis from 1 to 3 percent of said hydroxy terminated polybutadiene and from 0.1 to 0.3 percent of said diester.

9. Finely divided ammonium perchlorate produced in accordance with the process of claim 1.

* * * * *

UNITED STATES PATENT OFFICE
CERTIFICATE OF CORRECTION

PATENT NO. : 3,892,610
DATED : July 1, 1975
INVENTOR(S) : John R. Huzinec (Case 1)

It is certified that error appears in the above–identified patent and that said Letters Patent are hereby corrected as shown below:

Col. 6, Example 6, in Table, opposite $Fe_2O_3$ of p.p.;

"- 13 - 2" -- should read -- "- - - 2"

Signed and Sealed this sixteenth Day of September 1975

[SEAL]

Attest:

RUTH C. MASON
*Attesting Officer*

C. MARSHALL DANN
*Commissioner of Patents and Trademarks*